United States Patent
Hanley

[15] 3,647,029
[45] Mar. 7, 1972

[54] WHEEL CHOCK

[72] Inventor: John J. Hanley, 605-1650 Road, Delta, Colo. 81416

[22] Filed: May 1, 1970

[21] Appl. No.: 33,587

[52] U.S. Cl. ........................................................... 188/32
[51] Int. Cl. ........................................................ B60t 3/00
[58] Field of Search ..................... 188/32, 36, 4 A; 105/368

[56] References Cited

UNITED STATES PATENTS

| | | | |
|---|---|---|---|
| 1,317,329 | 9/1919 | Shoreday | 188/32 X |
| 1,617,369 | 2/1927 | Blakely | 188/32 |
| 2,237,214 | 4/1941 | Burkart | 188/32 |
| 2,895,569 | 7/1959 | Nystrom | 188/32 |
| 3,074,512 | 1/1963 | Naur | 188/32 |
| 3,542,157 | 11/1970 | Noah | 188/32 |

*Primary Examiner*—Duane A. Reger
*Attorney*—Clarence A. O'Brien and Harvey B. Jacobson

[57] ABSTRACT

A base member has a downwardly curved forward end portion which clamps the chock to a ground surface as soon as contact is made with a vehicle tire. The rear end of the base member pivotally mounts a movable member that has an outwardly and upwardly curved bottom edge for engaging the periphery of the tire as it moves into engagement with the chock. The curved nature of the movable member ensures continued intimate engagement with the tire. Abutments are attached to the base and movable members to function as mechanical stops after the tire has moved sufficiently onto the base.

6 Claims, 7 Drawing Figures

PATENTED MAR 7 1972 3,647,029
SHEET 1 OF 2
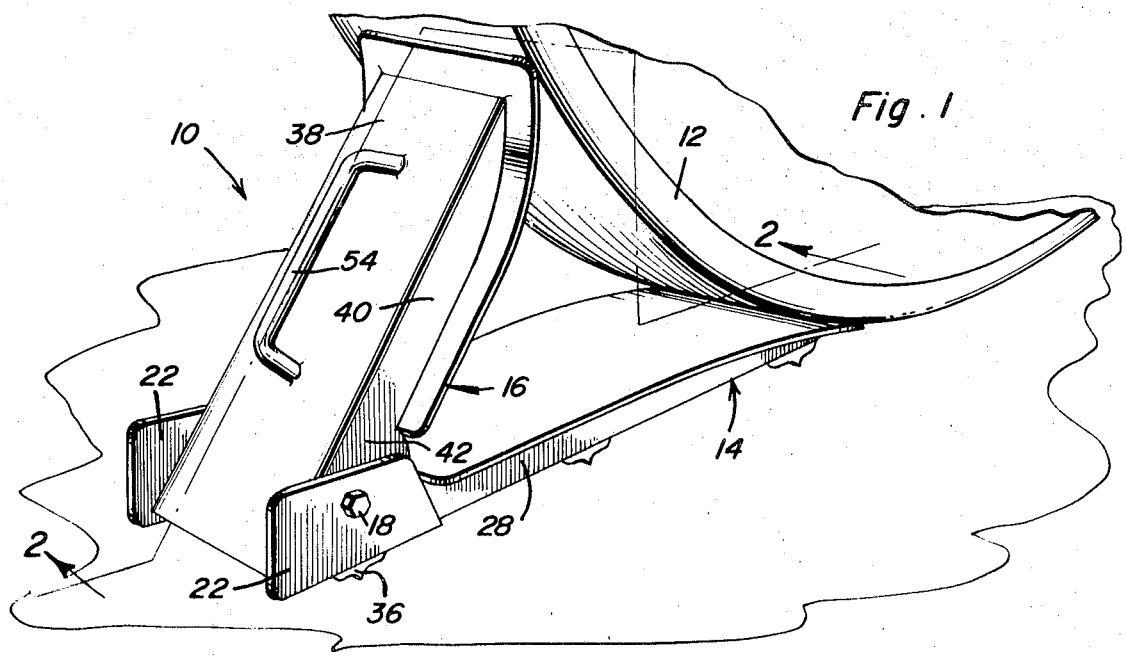
Fig. 1
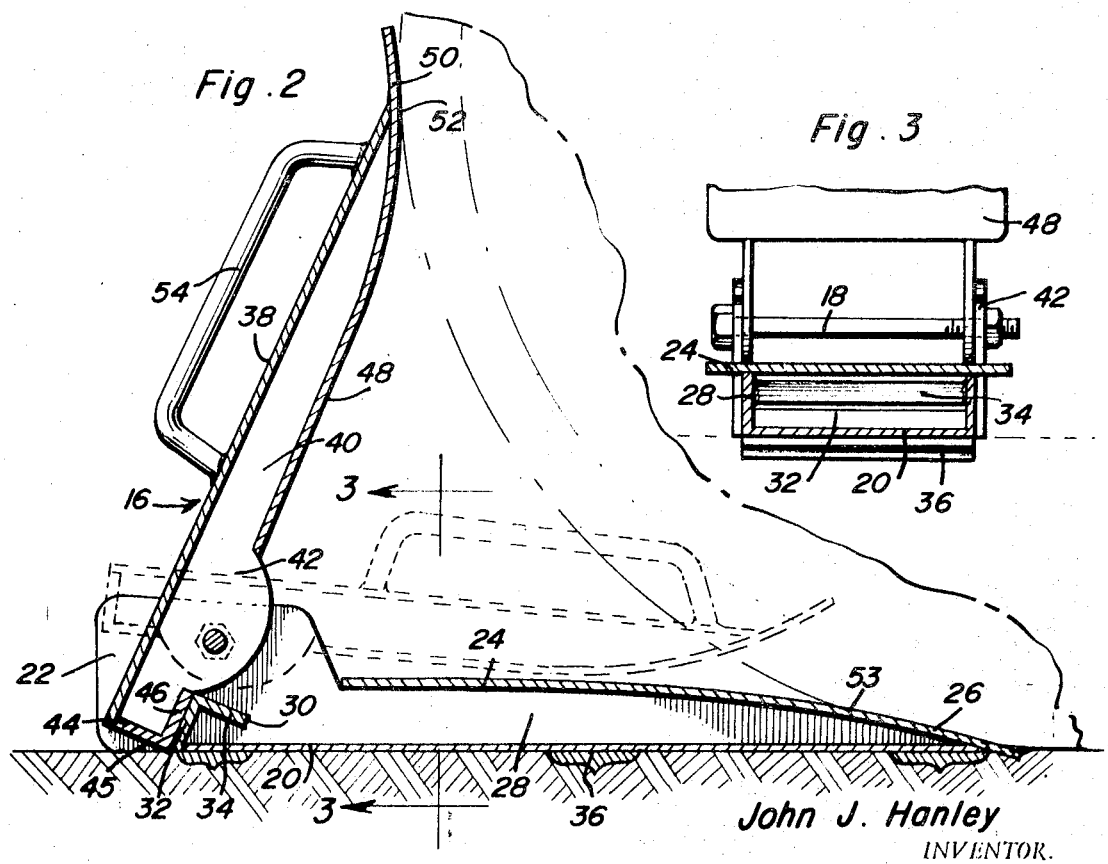
Fig. 2
Fig. 3
John J. Hanley
INVENTOR.
BY *Clarence A. O'Brien*
and *Harvey B. Jacobson*
Attorneys

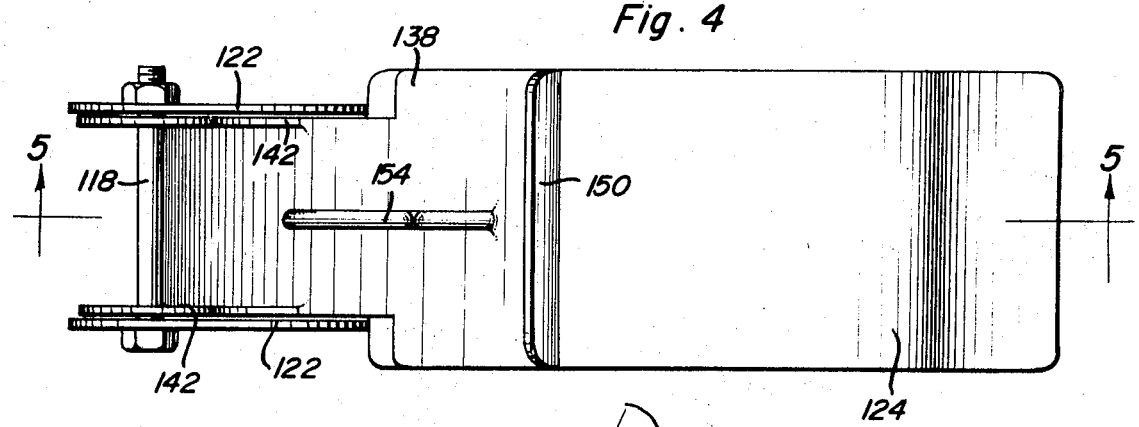
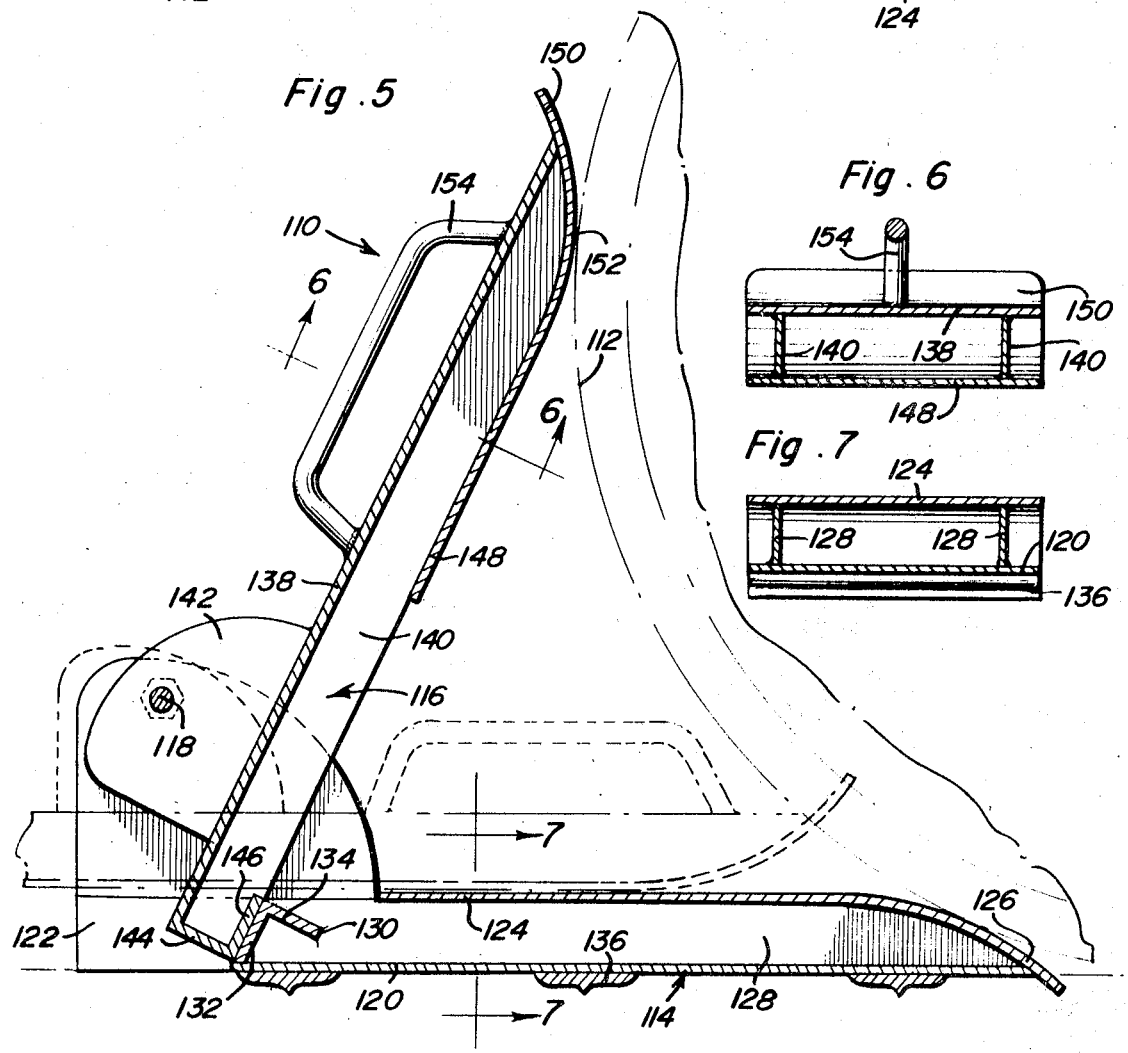
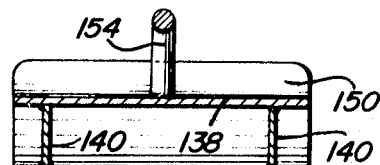

WHEEL CHOCK

The present invention relates to wheel chocks and more particularly to a wheel chock of the portable or collapsible type.

In the past, many different wheel chock designs have been conceived and used. A common type of collapsible chock includes pivotally mounted members that are capable of limited angular displacement, during wheel engagement, due to the use of linkages connecting the members. It has been found that utilization of such linkages decreases the reliability of the device and fails to offer the user complete safety. Further, prior art chocks generally have plain forward edges that make careful personal attention necessary when positioning the chock under a tire or wheel.

The present invention generically includes two movable parts including a base member and a pivotally mounted moving member. These members are simply connected by a pivot pin and do not require the attachment of structurally unreliable linkage members. Both members have forward end portions that are contoured with a reverse arc with respect to the arcuate portions of a tire contacted by the members. The contour of the base member forces the chock to become secured to a ground surface as soon as a tire makes significant contact with the forward curved portion of the base member. Also, the curved forward portion of the movable member undergoes camming action by an engaged tire so that the movable member follows the tire until abutments connected between the members make contact at which time further tire movement is prevented.

The reverse curvature, at the forward end portions of the chock members, with respect to the contacted tire arc portions, produces an absolute block for an entering tire. Because the tire rests partially on the base member of the wheel chock as soon as contact therewith is made, any advancement toward the movable member allows the tire to rest more firmly on the bottom member thereby resulting in a firmer block of the tire.

In the modern automobile with automatic transmission, it is sometimes necessary to service the vehicle with the transmission in a drive or reverse position while the engine is running. Any accidental movement of the vehicle toward the plain forward edges of conventional chocks could cause them to jump or skip. However, the reversed arc curvature formed in the members of the present invention would not permit this action to occur. Further, the present device is simply collapsed and stored in a compact space.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the operative position of a first form of the invention.

FIG. 2 is a sectional view taken along a plane passing through section line 2—2 of FIG. 1.

FIG. 3 is a transverse view taken along section line 3—3 of FIG. 2.

FIG. 4 is a top plan view of a second embodiment of the present invention which is adapted to handle larger tire and wheel sizes than the first embodiment.

FIG. 5 is a longitudinal sectional view taken along a plane passing through section line 5—5 in FIG. 4.

FIG. 6 is a transverse sectional view taken along a plane passing through section line 6—6 of FIG. 5.

FIG. 7 is a transverse sectional view taken along a plane passing through section line 7—7 of FIG. 5.

Referring to the drawings and more particularly FIG. 1, reference numeral 10 generally indicates a first embodiment of the present chock invention. A second embodiment to be discussed hereinafter is substantially similar to that of the first embodiment but is somewhat structurally modified to accept larger tires and wheels.

As illustrated in FIG. 1, a wheel tire 12 is adapted to engage a base chock member 14 and a pivotally mounted movable chock member 16, the members being pivotally secured by a simple nut and bolt fastener 18 passing through the rearward end portions of the members.

In FIGS. 2 and 3, the base member is seen to include a bottom rectangular plate 20 and an upper plate 24 that has a substantially flat intermediate portion that curves downwardly at 26 for attached intersection with the forward end of plate 20. Side plates 28 connect the underside of the overhanging upper plate 24 with the laterally offset bottom plate 20. Pivot securing plates 22 are laterally attached to the rearward portions of respective plates 28. As will be noted from FIG. 3, the hollow cross section of the base member enhances the chock's lightweight characteristic. An angle bracket or abutment 30 is secured by welding at opposite ends thereof to the confronting inner surfaces of plates 22. The bracket includes an angularly inclined flange 32 that extends upwardly from the bottom plate 20 at an angle approximating 45°. This flange serves as a contact for the movable member as explained hereinafter. A second flange 34 is disposed in perpendicular relation to flange 32. Transversely extending cleats 36 are suitably attached to the underside of bottom plate 20 and serve to anchor the chock into a ground surface during use.

Considering the particular structure of the movable member 16, reference is made to FIGS. 1 and 2 illustrating a top rectangular plate 38 that attaches sideplates 40 perpendicularly to the lateral edges of the upper plate 38. The rearward portions of the sideplates 40 include semicircular coplanar projections 42 that centrally receive the pivot bolt 18. The rear flange 44 of an angle iron or abutment 45 is perpendicularly attached to the underside of top plate 38 while a second right angle flange 46 of the angle iron 45 serves as a contact for engaging the previously mentioned contact 32 of angle iron 30. The engageable flanges act as a mechanical limit stop for the chock members. A bottom plate 48 is suitably attached to the underside of sideplates 40 and curves upwardly and outwardly at the forward edge 50 thereof. The forward edge 50 has been dimensioned so that it does not extend to the same length as forward edge 126. The bottom plate 48 extends laterally outwardly from the sideplates 40 and is dimensionally as wide as the facing plate 24 of the base member 14. As noted in FIGS. 1 and 2, the forward edge of top plate 38 intersects and is suitably attached to the forward end portion 50 of the bottom plate 48. It should be mentioned that the confronting faces of the base and movable members can have rasped surfaces for enhancing gripping. Tangential contact 52 between the arc tire portion and the reversed arc of the curved end 50 demonstrates a particular camming engagement between tire and chock members that ensures intimate engagement during rolling of the tire onto the chock. The reversed arc relation between the tire and the forward edge 50 is the same as applied to the forward edge 26 of the base member and its associated contacting arc portion 53 of the tire. A handle 54 is suitably attached by means such as welding to the upper surface of the top plate 38 and makes manipulation of the chock a simple matter. When not in use, the movable member 16 is collapsed into contact with the base member as shown in phantom in FIG. 3.

The second embodiment of the invention is illustrated in FIGS. 4–7. As will be seen from a cursory observation of the figures, the basic structure of the first embodiment relates to the second embodiment, the latter having a few structural modifications for particularly adapting the second embodiment to tires and wheels of larger diameters.

For purposes of convenience, the numbering of structural components for the second embodiment (FIGS. 4–7) corresponds to those of the first embodiment (FIG. 1–3). Thus, for example, the second embodiment is denoted by reference numeral 110 whereas the first embodiment is represented by reference numeral 10.

Tire 112 is seen to be in an engaged position with respect to the base member 114 and the movable member 116. As in the previous embodiment, a nut and bolt fastener 118 connects the members to allow pivotal displacement of the movable member. However, instead of the laterally positioned rear plates 22 of embodiment 10, larger semicircular plates 122 are attached to the sideplates 128 of base member 114 which enables the pivot pin 118 to be positioned at a greater height with respect to the upper plate 124 of the base member. By means of offsetting the pivot pin at a greater distance from the base member, a larger tire arc can be received between the chock members. As a consequence of this arrangement, a larger upwardly extending semicircular plate 142 is connected to each sideplate 140 in a direction perpendicular to the upper surface of the top plate 138 of the movable member 116. This is in contrast to the smaller semicircular projection 42 of the first embodiment 10 that extended downwardly from the sideplates 40.

Another difference between the embodiments exists in the bottom plate 148 which is rearwardly foreshortened as compared with its counterpart 48 in the first embodiment 10. Of course, there is no reason why the bottom plate 48 of the first embodiment cannot also be rearwardly foreshortened. However, a more fully extended bottom plate 48 was utilized for additional strength in the first embodiment inasmuch as the rearward edge of this plate can be conveniently attached by welding, or the like, to the projecting element 42. On the other hand, in the second embodiment 110, this additional attachment cannot be made due to the upward direction of the projection 142.

With the exception of the discussed differences, the remaining structural portions of the second embodiment are substantially the same as that of the first embodiment and therefore need not be particularly discussed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel chock comprising a base member and a movable member pivotally mounted to the base member, the members opening in response to urging engagement by an entering wheel, the base member having a ground engaging plate and a wheel engaging plate positioned in spaced relation to the ground plate, the wheel engaging plate turning downwardly at the forward end thereof to intersect the ground plate at a reversed arc direction with respect to a contacted peripheral portion of an entering wheel, said movable member comprising a support plate and a second wheel engaging plate positioned in spaced relation to the support plate, the wheel engaging plate curving upwardly at the forward end thereof to intersect the support plate at a reversed arc direction with respect to a contacted peripheral portion of an engaged wheel.

2. The device of claim 1 wherein the base member includes an abutment, and further wherein the movable member includes an abutment, the abutments making contact with each other after a preselected angular opening of the members occurs, said contact stopping further opening of the members thereby blocking the wheel.

3. The structure of claim 1 wherein the base member includes rearward pivot securing plates positioned in overlying relation with rearward projections on the movable member, and further wherein the ends of a pivot pin pass through the plates and the projections for producing a pivotal mounting for the members.

4. The structure of claim 3 wherein the pivot pin extends transversely through the movable member.

5. The structure of claim 3 wherein the pivot pin extends transversely above the movable member.

6. The structure set forth in claim 3 wherein the bottom surface of the ground plate attaches cleats for increasing the stationary characteristics of the base member with respect to the ground.

* * * * *